United States Patent [19]
Cohan

[11] 4,180,593
[45] Dec. 25, 1979

[54] PROCESS FOR PRODUCING ROUND SPHERICAL FREE FLOWING BLOWN BEAD FOOD PRODUCTS OF CONTROLLED BULK DENSITY

[76] Inventor: Allan N. Cohan, 1143 Wright Dr., Huntingdon Valley, Pa. 19006

[21] Appl. No.: 792,384

[22] Filed: Apr. 29, 1977

[51] Int. Cl.² ............................ A23L 1/30; F26D 3/12
[52] U.S. Cl. .......................................... 426/72; 34/10; 34/57 R; 34/66; 159/48 R; 159/DIG. 23; 426/470; 426/471; 426/474
[58] Field of Search ............... 426/471, 311, 470, 474, 426/285, 648, 650, 534, 72, 561, 656; 34/10, 57 R, 66; 159/48 R, 4 R, DIG. 23, DIG. 10, DIG. 11

[56] References Cited

U.S. PATENT DOCUMENTS

| | | | |
|---|---|---|---|
| 2,206,319 | 7/1940 | Geitz, Jr. | 426/311 |
| 2,785,077 | 3/1957 | Kaufman | 426/470 |
| 3,042,526 | 7/1962 | Spiess, Jr. et al. | 426/285 |
| 3,072,486 | 1/1963 | Oakes et al. | 426/470 |
| 3,222,193 | 12/1965 | Hanrahan | 426/470 |
| 3,391,002 | 7/1968 | Little | 426/650 |
| 3,782,963 | 1/1974 | Duvall et al. | 426/311 |
| 3,824,323 | 7/1974 | Harvey et al. | 426/650 |
| 3,949,096 | 4/1976 | Johnson et al. | 426/471 |
| 4,038,422 | 7/1977 | Keyser et al. | 426/311 |

FOREIGN PATENT DOCUMENTS

1276437 4/1970 United Kingdom ..................... 426/285

*Primary Examiner*—S. Leon Bashore
*Assistant Examiner*—Steve Alvo
*Attorney, Agent, or Firm*—Pollock, Vande Sande & Priddy

[57] ABSTRACT

Food products in the form of blown beads are prepared by spraying a composition into a heated zone to dry and expand the sprayed product followed by subjecting the product to a cooling zone to thereby quench cool and to thereby aid in the control of their bulk density.

16 Claims, 2 Drawing Figures

PROCESS FOR PRODUCING ROUND SPHERICAL FREE FLOWING BLOWN BEAD FOOD PRODUCTS OF CONTROLLED BULK DENSITY

BACKGROUND OF THE INVENTION

The present invention is concerned with the preparation of food products in the form of blown beads, and particularly to the preparation of food products in the form of round spherical free flowing expanded beads.

A number of food products are prepared by spray drying expandable liquid compositions to obtain edible blown beads. Such products include edible bulking materials, food flavorings, food sweeteners, food colorings, spices, dehydrated drinks such as tea, coffee, and flavored drinks.

The spray drying of products suitable for human consumption involve certain precautions and limitations in view of the materials employed. For instance, temperatures of the drying and the length of time that the food material can be exposed to elevated temperatures are limited because of their possible detrimental effect on the quality of the product.

Many of the blown beads do not have particle shells sufficiently strong to maintain their integrity and resist vapor holes from forming during expansion or resist crushing during shipment. This results in a nonuniform looking product which detracts from its commercial appeal.

A further recurring problem in preparing blown beads of food products is control of the bulk density of the blown bead. This is especially important in consumer products where the product may be used by the spoonful. This is also important in packaging in a container of predetermined volume where slack fill and excessive overfill are to be avoided.

Accordingly, it is an object of the present invention to provide a process for preparing edible products in the form of round spherical free flowing blown beads whereby the bulk density of the beads can be regulated and rendered substantially uniform. A further object of the present invention is to provide a process whereby the strength of the particle shell or walls are increased thereby greatly reducing, if not substantially eliminating altogether, the formation of vapor holes.

A further object of the present invention is to provide as much as possible the agglomeration of undivided blown beads during the processing.

SUMMARY OF THE INVENTION

The present invention is concerned with preparing edible food products in the form of blown beads and includes providing a sprayable composition which includes an edible film forming food product, a liquid which is in an amount sufficient to render the composition flowable, and a blowing agent. The composition is sprayed or atomized to thereby form beads which are subjected to a heated zone to cause expansion and drying thereof. Next, the beads are subjected to a cooling zone with a temperature sufficiently low so as to quench cool the beads.

By the particular combination of subjecting the beads to a zone at elevated temperature, followed by quench cooling, it is possible to regulate the particle size of the beads and bulk density depending on the relative flow rate of the beads and relative temperatures and times in which the beads are subjected to the elevated temperature and to the cooling zone. In addition, it has been noted that beads prepared by the above process have increased wall strength.

DESCRIPTION OF PREFERRED EMBODIMENTS

Figure 1:
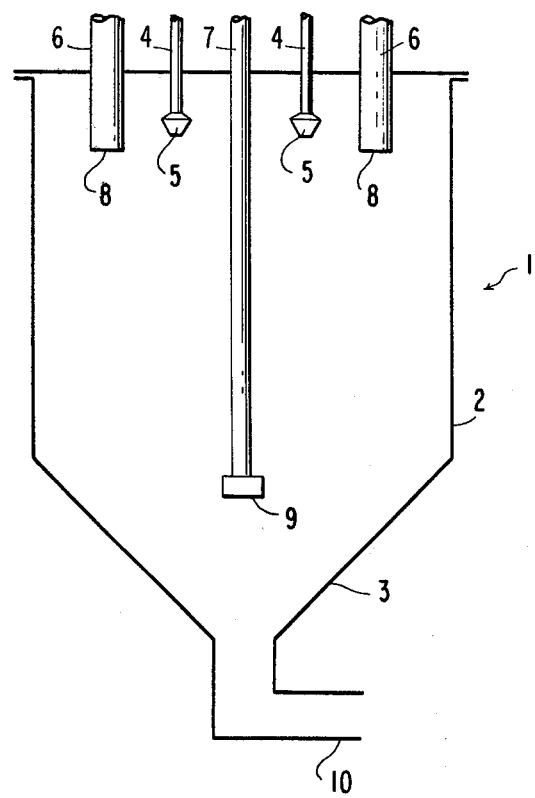
FIG. 1 is a schematic elevated diagram of one type of spraying apparatus suitable for carrying out the process of the present invention.

The composition to be treated according to the present invention must include an edible food material which is capable of forming a film during the atomization and must include such material in sufficient amounts so as to provide a bead of adequate strength. Included among the suitable food materials are carbohydrates such as the dextrins, starch, pectin, algin, methyl cellulose, carboxy methyl cellulose, carboxy methyl amylose, carboxy methyl amylopectin, dextrose, fructose, maltose, lactose, and dextrans, natural gums such as tragacanth, acacia, arabic, locust bean, caraya, and carragean. In addition, aqueous extracts of coffee, tea, chocolate, yerbamate, roasted cereal products such as simulated coffee products can be employed. Further included in the types of materials suitable for the present invention are cereal products such as extracts of grains or finely divided cereal material made from wheat, barley, malted barley, rice, corn, hydrolized cereal solids and the like.

Mixtures of the above edible materials with each other or with other edible materials can be employed, when desired. For instance, the present invention is applicable to providing a low bulk density carrier in combination with and preferably encapsulating a flavor such as coffee, chocolate, and tea; colors; or sweetening agents. Suitable sweeteners include natural sweeteners such as fructose, sucrose, invert sugar, honey, polysaccarides, extracts from orange and grapefruit peels, and artificial sweeteners including cyclamates, saccharin, and aspertane. Preferred carriers include maltose, lactose, finely divided cereal materials, and dextrins.

As noted above, the process of the present invention is of wide applicability and can be applied to edible food products of many types. It is noted that when the materials are already of a liquid character, they may be converted into beads directly or after suitable adjustment of texture and processed as hereindescribed to yield the blown beads. Where the food materials are of a solid nature, they may be converted to liquid form by application of conventional techniques such as admixing with water or other suitable liquid, extraction with water, comminuting, pressing, cooking in water, steaming or other known techniques as may be applicable to the particular material in question.

It is recognized that mixtures of food products are contemplated for application in the process of the present invention.

The composition to be sprayed must also include a liquid material in an amount sufficient to render the composition flowable. As discussed hereinabove, the liquid may already be present along with the film-forming material or may have to be incorporated therein. The preferred liquid is water. However, other edible liquids as long as they are compatible with the particusity of the beads can be accurately controlled. Moreover, the strength of the walls in view of the quench cooling as opposed to merely permitting the beads to slowly cool at room temperature over an extended period of time are much harder and thereby resist crushing during shipment and resist vapor holes during the blowing operation.

Further advantage of the quench cooling is that the beads are maintained at elevated temperatures for reduced amount of time thereby flavors and sweeteners when used are much more concentrated than previously obtained due to the deleterious effect of heat upon flavors and sweeteners. Also, colors when employed are less apt to fade when subjected to reduced times at the elevated temperatures. After the beads are cooled, they can be collected by conveying them to conventional cyclones and stored.

In addition, heat sensitive edible materials such as vitamins, proteins, and flavors (e.g., in powdered form) can be added to the blown beads in the cooling zone to provide mixtures. For example, such can be added as powders or oils to the cooling zone through conduit (not shown) in the bottom portion 3 of FIG. 1 or into the screw conveyer of FIG. 2 via a conduit (not shown). This is advantageous since the heat sensitive materials are not subjected to any elevated temperatures. Also, the addition at this stage eliminates the need for a separate mixing step at some later time to provide a mixture of the blown bead and heat sensitive material. The rate of introduction of such heat sensitive edible material would be sufficient to provide the desired amount to be effective for its intended purpose.

Figure 2:
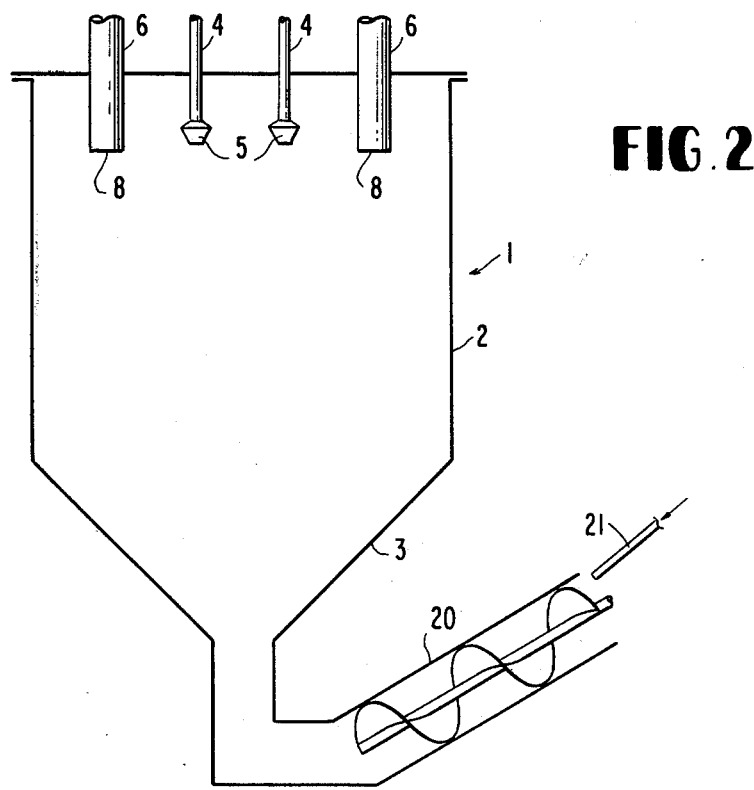
FIG. 2 is a schematic elevated diagram of a further type of apparatus suitable for carrying out the process of the present invention.

The process of the present invention can be carried out in the types of equipment shown in FIGS. 1 and 2 wherein like numbers refer to the same elements. For instance, FIG. 1 illustrates a closed spray drying vessel 1 containing an upper portion 2 and a lower tapered portion 3. The flowable composition is sprayed into the upper portion 2 via lines 4 and nozzles 5. Heated gases such as heated air are introduced into the top portion 2 of the dryer via lines 6 through exits 8 to thereby contact the atomized material coming from the spray dryer 5 to promote expansion of the beads and drying of the particles. Cold liquified gas under pressure is introduced into the bottom portion 3 of the device via conduit 7 and spraying unit 9 to provide a zone for the quench cooling of the particles. The cooled particles then exit from the apparatus through outlet means 10. The beads can then be sent to cyclones (now shown) and then to storage.

FIG. 2 illustrates an apparatus similar to that illustrated in FIG. 1 except that the particles are quenched cooled in screw conveyer 20 which is attached to outlet 10. Cold liquified gas is injected at the outlet end of the screw conveyer 20 via conduit 21 to flow countercurrently to the expanded beads from unit 1 and to thereby quench cool the beads. The screw conveyer, if desired, can be jacketed (not shown) to provide further cooling means to the walls of the conveyer.

The following example is further presented to further illustrate the present invention.

EXAMPLE 1

An aqueous slurry containing about 264 gallons of water, about 1,875 pounds of maltodextrane, and about 6% by pressure weight of ammonium bicarbonate was spray dried in a 15 foot spray tower. The temperature of the composition is about 80° F. as it enters the spraying apparatus. Heated air at a temperature of about 450° F. is injected into the apparatus at a flow rate of about 10,000 CFM. Calculation of the overall average contact available by dividing the dryer volume by the air flow rate indicates a time of approximately 3½ seconds in the heated zone. Next, the dried beads are contacted with a carbon dioxide atmosphere at about 0° F. from liquified carbon dioxide supplied at a pressure of 300 psig. The beads are quenched cooled in about 5 seconds to about 10°-20° F. and exit the apparatus at about 10°-20° F. The product obtained has a bulk density of about 6 lb/ft.$^3$.

What is claimed is:

1. A process for producing food product in the form of round spherical free flowing blown beads which comprises:
    A. providing sprayable, flowable composition containing an edible film forming food product, liquid in an amount sufficient to render the composition flowable, and a blowing agent; said blowing agent being present in said composition prior to the spraying step (B) below;
    B. spraying said composition to atomize said composition to form beads;
    C. subjecting said beads to a heated zone to therefore expand said beads by expansion of gases within the interior of said beads and to dry said beads; and
    D. subjecting the expanding beads to a cooling zone to quench cool said beads to thereby stop the expansion of said beads and aid in the control of their bulk density.

2. The process of claim 1 wherein said composition is at a temperature of about 55° to about 200° F. as it is sprayed.

3. The process of claim 1 wherein said composition is at a temperature of about 75° to about 190° F. as it is sprayed.

4. The process of claim 1 wherein said heated zone is between about 320° and about 800° F.

5. The process of claim 1 wherein said heated zone is between about 35° and about 525° F.

6. The process of claim 1 wherein the beads are quench cooled in about 180 seconds or less.

7. The process of claim 1 wherein the cooling zone is between about 0° and about 32° F.

8. The process of claim 1 wherein the cooling zone is between about 0° and about 22° F.

9. The process of claim 1 wherein said blowing agent is a gas.

10. The process of claim 1 wherein said blowing agent forms a gas in situ during the heating.

11. The process of claim 10 wherein said blowing agent is ammonium bicarbonate.

12. The process of claim 1 wherein the beads are quench cooled in about 10 to about 60 seconds.

13. The process of claim 1 wherein the beads are quench cooled in about 10 seconds or less.

14. The process of claim 1 wherein the beads are quench cooled in about 0.5 to about 8 seconds.

15. The method of claim 1 which further includes introducing a heat sensitive edible material into the cooling zone to provide a mixture of the blown beads and the heat sensitive edible material.

16. The method of claim 15 wherein said heat sensitive edible material is selected from the group consisting of vitamins, proteins, flavors, and mixtures thereof.

* * * * *